United States Patent Office 3,562,102
Patented Feb. 9, 1971

3,562,102
PAPER CONTAINING ALKYL GLYCIDYL MIXED ESTERS AND AMINE REACTION PRODUCTS THEREOF
Van R. Gaertner, Ballwin, Mo., assignor to Monsanto Company, St. Louis, Mo., a corporation of Delaware
No Drawing. Original application Dec. 17, 1965, Ser. No. 514,709, now Patent No. 3,459,715. Divided and this application Oct. 31, 1968, Ser. No. 772,401
Int. Cl. D21h 3/44
U.S. Cl. 162—168      10 Claims

ABSTRACT OF THE DISCLOSURE

Mixed alkyl glycidyl esters of polycarboxylic acid or anhydride-containing adducts of olefinically unsaturated natural oils and of polycarboxylic acid or anhydride-containing copolymers with alpha-olefin compounds, and amine reaction products thereof, which are useful in the preparation of sized cellulosic paper substrates and in the preparation of cured films and solid resinous potting compositions.

---

This application is a division of application Ser. No. 514,709, filed Dec. 17, 1965, now Pat. No. 3,459,715.

This invention relates to glycidyl esters of modified natural oils, to partial esters of synthetic polymers, and to uses of the resulting products in the making of films and in the making of water dispersible, polyamide derivatives which are especially suited for use as a cellulose sizing agent, e.g., paper or textile sizing agents. More particularly, this invention provides mixed alkyl glycidyl esters of reaction products of maleic anhydride and natural and synthetic olefinic materials. It also provides useful film forming amine reaction products of said alkyl glycidyl esters, as well as water dispersible quaternary amine derivatives of said alkyl glycidyl esters.

An object of this invention is to provide economically obtainable versatile mixed poly(alkyl glycidyl esters) which are adaptable for use in widely varying circumstances, such as in the making of cured films and solid resinous potting compositions, and in the making of water dispersible, substantive paper and textile sizing agents.

A further object of this invention is to provide water dispersible amine containing derivatives of the mixed alkyl glycidyl esters.

A further object of this invention is to provide a sizing composition for paper which allows facile "broke recovery" by the sized paper manufacture.

A further object of this invention is to provide a method for preparing mixed alkyl glycidyl esters of polycarboxylic acid or anhydride containing adducts of olefinically unsaturated natural oils and of polycarboxylic acid or anhydride containing synthetic polymers with alpha-olefin compounds.

Briefly, this invention provides a process for preparing new mixed alkyl glycidyl esters of (a) adducts of maleic anhydride and a non-conjugated, olefinically unsaturated, non-hydroxylated, fatty oil having an average of from 10 to 24 carbon atoms in the carbon chain of the fatty acid moiety of said fatty oil, and (b) a polymer of maleic anhydride and a polymerizable alpha-olefin, by reacting an epihalohydrin with a carboxyl containing lower alkyl partial ester of the reaction product (a), or (b) above in the presence of a quaternary ammonium catalytic compound catalyst, and an alkali metal salt forming basic compound. The epihalohydrin is used in excess to drive the reaction toward formation of a poly(alkyl glycidyl) mixed ester product. The alkali metal salt forming basic compound is preferably a sodium or potassium lower alkoxide dissolved in excess alcohol and is used in an amount which is about stoichiometrically equivalent to the degree of reaction desired by the epihalohydrin and the partial ester reaction product. In addition, this invention contemplates using the poly(alkyl glycidyl) mixed ester reaction products as intermediates, for making cross-linked or cured solid resinous polymers which can be used in making films and as solid potting compositions by treating the product with aliphatic poly-primary amines, but more particularly, as intermediates in the preparation of water-dispersible sizing agents for paper and cellulose containing textiles by reacting the mixed alkyl polyglycidyl ester reaction product with a diamine having at least one secondary or tertiary amino group, in the presence of a diluent mixture of a hydroxyl containing organic compound and water, at a temperature of from about 20° C. to 125° C.

The resulting amine treated solutoins may be used as such as a wet end or internal size by applying it to the pulp slurry used to make paper or as a surface size by application to a paper web. When the amine treated product is not to be used for some time it is preferred to stabilize it against substantial cross-linking by treating the amine product with an acid to lower the pH of the product to a stable range, which is usually below pH 7.

As can be seen from the above brief description the mixed alkyl glycidyl esters can be prepared from the two different types of maleic anhydride reaction product starting materials. The preferred reaction product starting materials are the synthetic polymers of maleic anhydride and an alpha-olefin because they give better looking products and better performance results. However, the maleic anhydride-unsaturated fatty oil adducts may also be used to make effective products according to this invention.

The fatty oils which are used to prepare the reaction products of type (a), described above, have been described in detail in the prior art literature, especially the patent literature. The unsaturated fatty oils may be found in the glyceride esterified for more in the free acid form. A few examples of such useful oils are olive oil, peanut oil, almond, neat's foot, pecan nut, lard, tung oil, safflower oil, linseed oil, cottonseed oil, soybean oil, etc.

As indicated above, maleic anhydride is preferred for preparing the polycarboxylic acid or anhydride adduct with the naturail oil. However, other alpha,beta-olefinically unsaturated polycarboxylic acid or anhydride may be used to replace a part or all of the maleic anhydride, if desired. A few examples of such materials include fumaric acid, aconitic acid anhydride, itaconic acid anhydride, citraconic acid anhydride, mesaconic acid anhydride, half methyl maleate, dimethyl maleate, and compounds which yield maleic anhydride and the like such as malic acid, maleic acid, citric acid, if subjected to the conditions under which maleic anhydride is produced.

For preparing starting materials of type (b) above, maleic anhydride is reacted with polymerizable alpha-olefin. The term "alpha-olefin" and "olefin" are used herein as general terms to designate olefinically unsaturated compounds in which the double bond is in the alpha position, and is intended to include not only olefinically unsaturated branched and straight chained hydrocarbons such as the aliphatic olefins, e.g., ethylene, propylene, 1-butylene, isobutylene, 1-pentylene, 1-hexene, 1-octene, 1-nonene, 1-decene, 1-dodecene, 1-tridecene, 1-tetradecene, 1-pentadecene, 1-hexadecene, 1-octadecene, 1-eicosene, 1-docosene, 1-tetracosene, 1-pentacosene, etc. and the aromatic alpha-olefin hydrocarbons such as styrene, alkyl-substituted styrenes such as vinyl toluene, the vinyl xylenes, vinyl 4-ethylbenzene, the chloro-substituted styrenes, etc. but is also intended to include other alpha-olefinically unsaturated polymerizable compounds such as alkyl vinyl ethers having about 8 or more carbon atoms in the alkyl groups, the corresponding alkenyl vinyl ethers having at least about 8 carbon atoms in the alkenyl group where sizing action is being sought. When it is desired to impart some wet or dry strength to the paper made from pulp treated with these polymeric poly(methyl glycidyl-amine) reaction product compositions the alpha-olefin used may also include the shorter chained olefinic hydrocarbons, alkyl vinyl ethers, as well as unsaturated acid monomers such as acrylic acid and methacrylic acid, vinyl esters such as the vinyl alkanoates including vinyl acetate, vinyl propionate, etc., the acrylate and methacrylate esters, such as methyl methacrylate, ethyl acrylate, and vinyl compounds such as vinyl chloride, vinylidene chloride, etc. Mixtures of the alpha-olefins may be used to react with the maleic anhydride to make the copolymer materials used for this invention, e.g., mixtures of alkyl vinyl ethers and vinyl toluene may be reacted with maleic anhydride to prepare useful copolymers. Thus the term "copolymers" as used herein includes the use of interpolymers of more than two monomer materials.

The alpha-olefins used in preparing the copolymers can vary considerably in molecular weight and can contain an average of from 2 to about 40 carbon atoms. The hydrocarbon alpha-olefins can be obtained from naturally occurring compounds or by the polymerization or cracking of petroleum fractions and the like. In commercial practice, they are generally mixtures containing compounds of varying length. Therefore, the number of carbon atoms attributed to such mixtures represents a weighted average rather than an absolute value. Those copolymers prepared from the lower olefins (say, up to about 12 carbon atoms) result in the formation of products which provide improved wet and dry strength, whereas utilization of the higher olefins provides hard sizing in addition to the other advantageous properties.

Vinyl ethers, which may be used in preparing the copolymers used to prepare the polymeric reaction products, may be prepared in conventional manner by treating an alcohol with an alkali catalyst followed by reaction with acetylene. The alcohols used can be straight or branched chained, obtained from natural products or by synthetically made, e.g., those alcohols resulting from the "oxo" and other processes. The vinyl ethers have the general formula Z—O—CH=CH$_2$ wherein Z is alkyl, alkenyl, aryl, alkoxyalkyl, aryloxyalkyl, alkylaryl and the like containing from 2 to about 40 carbon atoms and preferably from about 8 to about 32 carbon atoms if hard sizing is desired. Representative vinyl ethers such as the oxo-decyl, oxo-tridecyl, oxo-hexadecyl, oxo-nonadecyl, propyl, hexyl, n-decyl, n-dodecyl, n-octadecyl, n-tetracoxyl, n-tritriacontyl, tetratricontyl, n-hexatriacontyl vinyl ethers, the corresponding alkenyl vinyl ethers, a few examples of which are dodecenyl vinyl ether, heptadecenyl vinyl ether and octadecenyl vinyl ether, as well as the aryl, aralkyl, and alkaryl, alkoxyaryl, aryloxyaryl, aryloxyalkyl vinyl ethers, e.g., pheynl, benzyl, tolyl, xylyl, dodecylphenyl, octadecylphenyl, dinonylphenyl, methoxyphenyl, ethoxyphenyl, dodecyloxyphenyl, octadecyloxyphenyl, phenoxyhexyl, phenoxyoctyl, phenoxyoctadecyl vinyl ethers and the like.

The alpha-olefin-maleic anhydride copolymers utilized as starting materials in the preparation of the polymeric alkyl glycidyl esters usually contains essentially equimolar proportions of the alpha-olefin and maleic anhydride units. However, copolymers in which the molar ratio of maleic anhydride to alpha-olefin is from about 0.90:1 to about 1.8:1 can be utilized. Copolymers having about equimolar amounts of maleic anhydride are preferred. The best sizes are made from copolymers having substantially alternating maleic anhydride-olefin moieties. The copolymers are prepared in conventional manner with or without solvents such as benzene or xylene, and using catalysts such as azobis(isobutyronitrile), di-t-butyl peroxide, t-butyl perbenzoate, benzoyl peroxide, and any initiator which will be effective at from about 50–150° C. such as isopropyl peroxydicarbonate, tetrachlorobenzoyl peroxide and the like. The polymers employed in accordance with this invention have molecular weights of at least about 2,000, and may range up to the general neighborhood of about 200,000. Molecules of excessive size introduce operational difficulties such as a rapidly increasing tendency to gel, reduced ease of application and the like; whereas polymers having a molecular weight substantially under 2,000 provide less satisfactory sizes. However, it is considered that the better copolymers used in this work preferably have an average molecular weight substantially under 2,000 provide less satisfactory sizes. However, it is considered that the better copolymers used in this work preferably have an average molecular weight of from about 50,000 to about 115,000. Copolymers having these molecular weights are generally those made by polymerizing one or more alkyl vinyl ethers with maleic anhydride.

The epihalohydrin reactant used in the process of this invention is preferably epichlorohydrin but may be epibromohydrin, epiiodohydrin, or other vicinal halohydrins such as 1,2 - epoxy - 3 - chlorobutane, 1,2-epoxy-3-bromopentane, etc.

Before reacting the reaction product (a) or (b) above with the epihalohydrin, it is treated with a suitable alcohol under conditions which cause ring opening of the maleic anhydride moieties in the adducts (a) or polymers (b) and esterification of one of resulting carboxyl groups. It is preferred that such alcohol be a lower alkanol such as methanol, ethanol, propanol, or a small alkoxyalkanol such as methoxyethanol, butoxyethanol, etc. Heating a mixture of the maleic anhydride fatty oil adduct (a) or the maleic anhydride-alpha-olefin copolymer and the alkanol to reflux until the anhydride content is substantially depleted is sufficient for preparing the starting material for this invention. A tertiary amine catalyst such as triethylamine greatly speeds the esterification. It is preferred to reduce the anhydride content to less than one percent of the original anhydride content of the adduct or polymer for efficient use of chemicals.

In conducting the process of this invention the maleic anhydride fatty oil adduct (a) or the maleic anhydride copolymer (b) is mixed with at least a stoichiometric amount of the epihalohydrin relative to the carboxyl content of the partially esterified starting material in a water diluted solution of an appropriate organic solvent, e.g., an alkanol such as butanol, or a hydrocarbon-alcohol mixture such as an isopropanol xylene mixture, butanol-toluene and the like, but is preferably a water diluted excess of the epihalohydrin so that the excess serves as a diluent or solvent for the reacting materials. The water should constitute from about 20 percent to 50 percent of the total solvent system used, and is preferably within the range of from about 30 percent to 40 percent of the solvent. To accomplish esterification in any reasonable period of time a quaternary ammonium basic compound is added as catalyst for the addition of the epihalohydrin to the free carboxyl group on the maleic moiety. Examples of quaternary ammonium compounds which may be used are long chained alkyl- and aralkyl-tris-lower alkyl ammonium hydroxide and salts, e.g., hexadecyltrimethylammonium chloride, octadecyltriethylammonium bromide, benzyltrimethylammonium hydroxide, tetraethylammonium chloride and (4-methylbenzyl)trimethylammonium sulfate, etc.

In addition to an excess of epihalohydrin, and the use of a quaternary ammonium compound catalyst, there is used in this step of the process an alkali metal salt forming basic compound which is used in an amount at least stoichiometrically equivalent to the amount of free carboxyl content of the starting partially esterified adduct (a) or polymer (b) which liquid phases, and drying of the product over suitable agents such as sodium sulfate and magnesium sulfate, etc.

These resulting products which contain mixed alkyl glycidyl esters of the adduct (a) or polymer (b) starting materials contain numerous

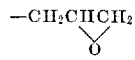

groups, and are not to be confused with products prepared from an epihalohydrin so as to contain only hydroxyalkyl ester groups, e.g.

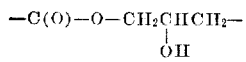

These intermediate products of this invention may be reacted with various known epoxide cross-linking agents such as the aliphatic poly-primary amine alkylene polyamines, and polyalkylenepolyamines, having from 2 to 4 carbon atoms in the hydrocarbon moieties between the nitrogen atoms, e.g., ethylene diamine, diethylene triamine, dipropylenetriamine, tetraethylenepentamine, tributylenetetramine, etc. as well as with polycarboxylic acids and anhydrides thereof to form cured films and solid resinous bodies such as are used in water impervious coatings for cellulosic materials, as well as potting compositions used in encasing manufactured electrical devices, but they are particularly suited for use as intermediates in the manufacture of water dispersible sizing agents for cellulose containing materials such as paper, paper board and cellulose containing textiles.

Although the poly(methyl glycidyl) mixed ester product of the adduct (a) or the polymer (b) can be reacted with enough amine in the presence of an hydroxyl containing material to react with all of the glycidyl groups of the intermediate product, it is not necessary to so react all of the glycidyl groups. In general, the numerical ratio of epoxide or glycidyl groups to quaternary amine groups in the amine treated product can vary between about 0:1 and 2:1. It is preferred to maintain this ratio between about 0.1:1 and about 1.5:1. An increased ratio of water: solvent favors higher quaternary contents, thus better aqueous solubility.

The reaction between the poly(alkyl glycidyl mixed ester) intermediate and the diamine reactant can be conveniently carried out at moderate temperatures of from 0° C. to about 50° C., but preferably at 20°–35° C. by adding an appropriate amount of the amine to an aqueous solution of the poly(alkyl glycidyl mixed ester) intermediate in the presence of a diluent or solvent system which is an organic hydroxyl containing compound or compounds which are volatilizable at temperatures below 100° C. at atmospheric pressure, which is preferably an alcohol such as methanol, 2-propanol, butanol, ethoxyethanol, butoxyethanol, butylcarbitol, methanol-xylene mixtures, isopropanol-toluene mixtures, or which may be any other hydroxyl compound such as phenol, alkylene glycols, etc. The organic hydroxyl containing compound solvent used for this amination step may also contain some water if desired, but usually is not more than 50 percent of the total solvent system used. Preferably the water is used in amounts of from 1.0 to 40 percent of the total solvent system used in this step. Since the reaction is not instantaneous, the amount of amine entering the reaction can be controlled by the reaction time and temperature as well as by the amine added to the mixture. Although the reaction progresses slowly in the absence of appreciable water, it is catalyzed and proceeds quite rapidly upon the addition of the stated quantities of water. When water is added, the resulting aqueous mixture originally may become turbid. The turbidity of the aqueous reaction mixture may usually be dissipated, if desired, by dissolving the reaction product in aqueous mixtures of 2-propanol, e.g., a 2:1 volume water:2-propanol mixture. The resulting solution can then be diluted with additional water to any desired concentration for use as sizing agents.

The resulting amine treated poly(alkyl glycidyl mixed ester) products have a relatively short shelf or storage life since they are subject to cross-linking and gelation. In order to stabilize them in a convenient, commercially available form they are preferably treated with a hydrohalic acid, especially when some unreacted glycidyl groups are present in the amine treated product to adjust the pH thereof to between about pH 5 and pH 7, preferably pH 6 to 7. The hydrohalic acid, e.g., hydrochloric acid, or hydrobromic acid may be added alone, or in combination with other mineral acids such as phosphoric, sulfuric and the like. When the product contains no free glycidyl groups it may be stabilized with a mineral acid composition containing no hydrohalic acids. Such stabilizing compositions neutralize amino groups present, but do not add to any epoxides. Other inorganic and organic acids could also be used to effect stabilization of the product but the above mentioned acids are the most economical. The acid treatment converts the secondary amino or tertiary amino groups of the product to corresponding less reactive amine salt form which essentially stops further reaction or polymerization. These acidified amine treated poly(alkyl glycidyl mixed ester) products are stable for long periods of time, and thus can be subjected to normal shipping and storage without any danger of cross-linkage or consequent gelation.

With the acid stabilized amine treated products derived from poly(alkyl glycidyl mixed esters) of the maleic anhydride-fatty oil adducts (a) and the hydrocarbon alphaolefin maleic anhydride copolymers (b), it is generally desirable to pretreat them with an alkaline material, i.e., a base such as an alkali metal hydroxide to put them in a chemical form most suitable to efficiently size the cellulose pulp or paper. Similar acid stabilized products prepared from the alkyl vinyl ether/maleic anhydride copolymers, do not generally require such pre-treatment with a base before application to the pulp slurry or paper web. This alternative is of great benefit to the paper-maker users of these reaction products in that these products obviate any necessity for expensive machinery to pre-treat the chemical size compositions before application to the pulp.

Using the partial methyl ester of an alpha-olefin hydrocarbon/maleic anhydride copolymer as an illustrative starting material, the intermediate poly(methyl glycidyl) mixed ester product (I) is believed to have essentially alternating polymeric units of the following type therein

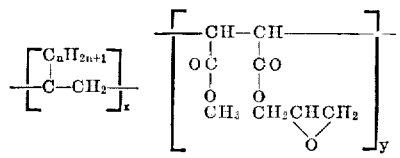

where $n$ is a positive whole number of from 0 to about 40, denoting an alkyl group, and $x$ and $y$ are numbers greater than 0, the preferred ratio of $y$ to $x$ being at least about 0.9:1.

The amine treated poly(methyl glycidyl) mixed ester products (II) can be exemplified by a product of the type described above treated with, for example, a ditertiary alkylene diamine such as N,N,N'N'-tetramethylethylenediamine to obtain a product having randomly recurring units of the following types; the olefin-derived units alternate with various anhydride-derived units.

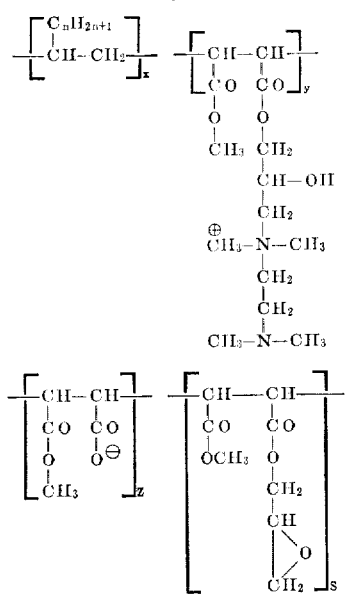

where $x$, $y$, $z$ and $s$ are whole numbers of greater than 0.

Upon treatment of the resulting product with an acid, preferably hydrochloric acid to adjust the pH of the composition to within the range of from about 5 to 7, and preferably to within pH 6 to pH 7, the same product can have the following randomly recurring anhydride derived groups:

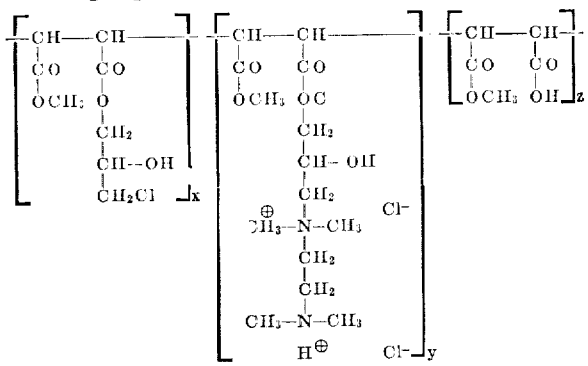

in addition to the alpha-olefin monomer units. Care should be taken to avoid adding too much acid during stabilization to reduce the pH of the composition to much below the stated lower limit to avoid hydrolysis of the ester groups until use. Similarly, pH conditions much above about pH 10 are to be avoided even during brief pretreatment of the amine product II to avoid hydrolysis of the ester groups in the product. However, one of the advantages of the products of this invention is that after having been applied to paper, cured and dried to obtain a good sized paper, the waste paper resulting from trimming, and the recovered machine "broke" obtained after the sizing operation can be treated with either acid or alkali to hydrolyze ester groups of the size composition to assist in the recovery and reuse of the waste pulp to form additional paper. The invention is further illustrated by the following detailed examples.

EXAMPLE 1

A 40 g. portion of a copolymer of a $C_{16}$–$C_{18}$ mixed alkenyl alpha-olefin hydrocarbon and maleic anhydride present in a mole ratio of 1:1.2 of olefin:maleic anhydride was treated with 80 g. of methanol, sealed in a bottle and rotated in an oven at 60° C. overnight, and then for three days.

A 61 g. portion of this methanol-polymer solution, containing 0.068 anhydride mole equivalent was mixed with 92.5 g. (1.0 mole) of epichlorohydrin, and 3.4 g. of a 40% aqueous solution of the quaternary benzyltrimethylammonium hydroxide, at once, and then with 15.0 ml. (0.06 mole) of a 4.42 N solution of sodium methoxide in methanol, dropwise, at 70°–95° C. while distilling methanol and water into a phase-separating distillation head, while stirring the mixture.

When 77 ml. of the distillate had collected, the distillation head was drained, and the trap was filled with epichlorohydrin, while continuing to heat the mixture to 115° C. (pot temperature) for 1 hour to insure complete reaction.

After allowing the pot residue to cool overnight it was filtered, rinsed with epichlorohydrin and the resulting clear amber solution was distilled to remove epichlorohydrin to 110° C./10 mm. leaving 28.0 g. of a translucent light cream colored gum, which was free flowing at 110° C., and which barely flowed at 25° C. The oxirane content of this poly(glycidyl methyl $C_{16}$–$C_{18}$ mixed olefin/maleate succinate) was 3.18%, as compared to a theory of 4.37% following the analytical procedure adapted from that of A. J. Durbetaki, Anal. Chem., 28, 2000 (1956). The polymer had a specific viscosity (4% by weight) of 0.33 in methyl ethyl ketone.

EXAMPLE 2

A 2.0 g. portion of the polyester, prepared as described in Example 1, was dissolved in 2.0 g. of butoxyethanol with warming and then at 32° C. was treated dropwise with 0.3 g. (4 meq.) of N,N,N',N'-tetramethyl-1,3-butanediamine and with 10 drops of water at 31° C. to cause turbidity. The mixture was stirred until the turbidity cleared in 10 minutes. An additional 10 drops of water was added while heating the mixture to from 29° C. to 32° C. for 1 hour. The mixture became homogeneous when it was heated to about 40° C. An additional 10 drops of water was added while heating the mixture to 60° C. On standing overnight the poly(glycidyl methyl $C_{16}$–$C_{18}$ mixed alkenyl/succinate: 1,3-butylenebisdimethylene) copolymer set to a soft rubbery gel.

EXAMPLE 3

A 21.4 g. portion of the poly(glycidyl methyl) $C_{16}$–$C_{18}$ mixed alkenyl/maleate copolymer prepared as described in Example 1 was dissolved in 20.0 g. of butoxyethanol with warming, and then treated with 2.3 g. (0.02 mole) of N,N,N',N'-tetramethylethylenediamine at once, at 25° C. with stirring. The temperature rose to 28° C. and then dropped to 27° C. Then 10 g. of solution containing 1.42 g. of HCl as 4.0 g. of a 37% aqueous solution was added over 3.67 hours at 28°–40° C. with stirring to maintain the turbid mixture at a pH of 4–5. After stirring the mixture overnight, the viscous product was treated with 4.0 g. of concentrated hydrochloric acid and 30.0 ml. of methanol. The gummy reaction product was mixed with butoxyethanol and then with water to give a water soluble solution of poly(glycidyl methyl $C_{16}$–$C_{18}$ mixed alkenyl/maleate):N,N,N',N' - tetramethylethylenediamine adduct.

EXAMPLE 4

A 164 g. portion containing 0.5 maleic anhydride equivalents) of an alpha-octadecene/maleic anhydride copolymer, having an octadecene to maleic anhydride molar ratio of 1:1.1, and a specific viscosity (4%) of 0.35, was treated with 200 g. of methanol while stirring and heating at reflux for 18 hours to form the half-methyl ester of the maleic moieties of the copolymer. After removing 50 ml. of methanol from the oily but homogeneous reaction product, the hot solution was cooled to a milky solution.

A 160 g. portion of the resulting poly(methyl half-ester of the octadecene/maleic) copolymer in methanol was treated with 231 g. (2.5 moles) of epichlorohydrin and with 10.5 g. of an 40% aqueous solution of the quaternary benzyltrimethylammonium hydroxide. The mixture was heated to 117° C. to distill methanol, and then 56.5 ml. of a 4.42 N sodium methoxide in methanol solution was added slowly and the mixture was heated at 117°–120° C. for 75 minutes, stirred and refluxed. The resulting mixture which had a pH of less than 8 was allowed to stand overnight and then 200 ml. of distilled water was added. Upon stirring, the turbidity of the mixture cleared. A sodium sulfate solution was added to speed separation of the aqueous layer from the epichlorohydrin layer. The epichlorohydrin layer, containing the product, was separated and dried over sodium sulfate. After filtering, the amber fluid solution was aspirated to 125° C./10 mm. to leave as residue 105.7 g. of light amber, clear poly(glycidyl methyl octadecene/maleate) having a specific viscosity of 0.32 (4% of polymer in methyl ethyl ketone) and an epoxy equivalent of 447.

EXAMPLE 5

A 25 g. portion of the poly(glycidyl methyl octadecene/maleate) polymer, prepared as described in Example 4, and containing 56 milliequivalents (me.) of glycidyl groups, was dissolved in 25.0 g. of butoxyethanol by warming. After cooling, the resulting solution was treated with 3.6 g. (50 me.) of N,N,N′,N′ - tetramethyl - 1,3-butanediamine. While stirring the mixture, water addition was begun at 26° C. and continued over 185 minutes until 20 ml. of $H_2O$ had been added. The temperature rose to a maximum of 42° C. during this time. After stirring an additional 85 minutes to insure complete reaction, there was added at 42° C. 10 ml. of solution containing 5.0 g. (50 millimoles) of conc. hydrochloric acid. An additional 10 ml. of the acid solution was added after 35 minutes. The reaction mixture was water dispersible. After adding 50 g. of butoxyethanol and then 33 g. of water the resulting translucent solution was clear. It was diluted with water to 19.4% polymer solids and used to size paper by immersing the paper in the solution. The resulting poly(glycidyl methyl octadecene/maleate):N,N,-N′,N′-tetramethyl-1,3-butanediamine product had a specific viscosity of 0.15 (1% in water at pH of 4).

EXAMPLE 6

A 53 g. portion of a 1:1.1 molar ratio styrene/maleic anhydride copolymer was mixed in 200 g. of methanol and mixture was heated to reflux (65° C.) with stirring until infrared analysis of samples indicated that no anhydride absorption remained and that only the half methyl ester was present.

After distilling the mixture to remove 170 ml. of methanol from the styrene/maleic half methyl ester copolymer, 231 g. (2.5 moles) of epichlorohydrin and 10.5 g. (0.025 mole) of 40% aqueous benzyltrimethylammonium hydroxide was added. The resulting mixture became homogeneous, was stirred and distilled to remove methanol and to remove an azeotrope of water with epichlorohydrin to a pot temperature of 120° C. Then the addition of 56 ml. of 4.4 N sodium methoxide in methanol solution was commenced dropwise and continued for 1 hour while distilling methanol to 100° C. Heating to 117° C. and stirring were continued for 1 hour to insure complete reaction, leaving a viscous solution of poly(glycidyl methyl styrene/maleate).

EXAMPLE 7

A 2.24 g. (5 me.) portion of the poly(glycidyl methyl octadecene/maleate) polymer, prepared as described in Example 6, was mixed thoroughly with 1.03 g. (5 me.) of diethylenetriamine. The resulting mixture was warmed to 60° C. in an oven. After 45 minutes the resulting polymer mixture set to a hard, friable cross-linked solid.

EXAMPLE 8

A copolymer of 1-hexene and maleic anhydride was prepared by combining 367 g. (3.75 moles) of maleic anhydride and 342 ml. (4.06 moles) of 1-hexene in 750 ml. of ethyl acetate using 21.25 g. of 2,2′-azobis[2-methylpropionitrile] as catalyst, and heating at 70° C. to 75.5° C. to reflux the mixture. Methanol was added to precipitate the 1-hexene/maleic anhydride copolymer. After drying there was obtained 507 g. of copolymer (71.5% yield) which had a specific viscosity of 0.09 (1% in methyl ethyl ketone).

To a mixture of 600 g. of methanol and 0.5 g. of triethylamine, warmed to 50° C., a 200 g. portion of the 1-hexene/maleic anhydride copolymer, prepared as described above, was added so as to prevent the copolymer from balling up. The mixture was heated to reflux (64–65° C.). When infrared analysis showed that only traces of anhydride groups remained in the polymer, i.e., the half methyl ester of the maleic moieties had formed, there was added 925 g. of epichlorohydrin while slowly distilling methanol. A 20.9 g. portion of a 40% (0.05 mole) solution of benzyltrimethylammonium hydroxide in water was added as the temperature was maintained below 110° C., while providing for the removal of methanol from the distillation trap. Then 223 ml. (1000 me.) of sodium methoxide in methanol solution was added over 75 minutes at 105–110° C. and then the temperature was raised and held at 115°–118° C. A total of 572 g. of epichlorohydrin was distilled out of the mixture with methanol. An additional 500 g. of epichlorohydrin was added and the reaction mixture was heated at 115°–120° C. for 2 hours. The mixture was cooled to 40°–50° C and 200 cc. of water was added. After mixing thoroughly, the contents were separated into an aqueous layer and an organic layer, diluted with chloroform. After drying the chloroform diluted portion, the liquid was placed in a flask and distilled in partial vacuum to remove chloroform and epichlorohydrin at temperatures below 100° C. distillation was continued until a temperature of 120° C./4 mm. was reached. The resulting product, poly(glycidyl methyl 1-hexene/maleate) had an epoxide oxygen content of 4.82% as compared with a theoretical epoxide content of 5.94%.

EXAMPLE 9

To a reaction vessel fitted with a stirrer, condenser, addition funnel, and nitrogen inlet there was added 362 g. (0.3 mole) of safflower oil, containing 73% linoleic acid, 21% oleic acid, and 6% saturated fatty acids. The vessel was swept with nitrogen to remove air therefrom. The safflower oil was heated to 200° C. and then there was slowly added thereto 88.2 g. of molten maleic anhydride (0.9 mole) over 2 hours. The temperature was raised to 220° C. until all of the maleic anhydride had reacted and then the reaction mixture was stripped of trace volatile material to 220° C./2 mm.

A 343.7 g. portion of the resulting safflower oil-maleic anhydride adduct was mixed with 200 g. of methanol and refluxed until the reaction to form the half methyl ester was essentially completed. Excess methanol was distilled off under vacuum and then 322 g. (3.48 moles) of epichlorohydrin (carboxy:epichlorohydrin 1:5) was added and mixed thoroughly. Then 29.2 g. of 40% benzyltrimethyl ammonium hydroxide in water solution was added. Then 156 ml. (700 me.) of sodium methoxide in methanol solution was added dropwise at a temperature sufficient to fractionate off methanol at a pot temperature of 90° C. The temperature was raised very slowly to 200° C. after all of the sodium methoxide had been added and held at that temperature for 2.5 hours. The triglycidyl trimethyl safflower oil-trimaleate product was washed with 200 ml. of water, separated, and dried over magnesium sulfate. It weighed 427.0 g. and contained 1.74% oxirane oxygen as compared with a theory of 2.72% oxirane oxygen (64% of theory).

EXAMPLE 10

A mixture of 362 g. of safflower oil (0.30 mole) and 167 g. (1.80 mole) of maleic anhydride was warmed to 200° to 220° C. under nitrogen until no unreacted maleic anhydride was present (infrared analysis).

A 308.5 g. portion of the resulting 1:6 molar safflower oil-maleic anhydride adduct was treated with 200 g. of methanol, and maintained at 60° C. until substantially all anhydride groups had been esterified to the half methyl ester. Methanol was removed under aspirator vacuum to 80° C. Then 1000 g. (10.8 moles) of epichlorohydrin and 41.7 g. of 40% aqueous benzyltriammonium hydroxide were added: and 25 ml. of water from the quaternary base was distilled as the azeotrope. After standing overnight the reaction mixture was treated with 223 ml. of 4.48 N sodium methoxide in methanol solution at a pot temperature of 90°–105° C. Methanol and some epichlorohydrin were distilled to a reaction temperature of 117° C. and maintained for 2.5 hours. Distillation in vacuo gave a residual product containing 2.94% oxirane oxygen (71.3% of theory) for hexaglycidyl hexamethyl safflower oil-hexamaleate (theory, 4.13% oxirane oxygen).

EXAMPLE 11

The procedure of Example 10 was repeated using 10 molar equivalents of maleic anhydride per molar equivalent of safflower oil. The resulting safflower oil-maleic anhydride adduct was heated with methanol to form the half methyl ester of the maleic moieties thereof, and then treated with 690 g. epichlorohydrin using benzyltrimethylammonium hydroxide and sodium methoxide in methanol as catalyst. After washing the crude product with water and then with ether, filtering, and removing excess epichlorohydrin and solvent, there was obtained 299 g. of a poly(glycidylmethyl) safflower oil-maleate product containing 3.09% oxirane oxygen which is 59.3% of theory for oxirane oxygen (5.22% for a decaglycidyl decamethyl safflower oil-decamaleate product.

EXAMPLE 12

To a solution of the hexaglycidyl hexamethyl safflower oil-hexamaleate, (50 meq. of epoxide), prepared as described in Example 10, in 250 g. of butoxyethanol there was added 2.04 g. of 3-(dimethylamino)propylamine in 10.0 g. of water. Five ml. portions of water were added as the mixture was stirred for 27.75 minutes. A 2.00 g. of conc. hydrochloric acid in 7 ml. of water was added. The total water added was 30 g. The reaction mixture was diluted with 80 ml. of butoxyethanol and 20 ml. of water to form a clear 17.0% solids solution of the N,N-dimethylaminopropyl amine derivative of the hexaglycidyl hexamethyl safflower oil hexamaleate which was stable at pH 6. At pH 4.0 and at a concentration of 1% in water this product had a specific viscosity of 0.15.

EXAMPLE 13

A 1-decene/maleic anhydride copolymer was prepared by treating 421 g. (3.0 moles) of 1-decene with 323.4 g. (3.30 moles) of maleic anhydride using 8.77 g. (0.06 mole) of di-tert-butyl peroxide as catalyst at a temperature of 145–148° C. The reaction mixture was 165°–170° for 25 minutes after adding the anhydride. After cooling overnight, the resulting 1-decene/maleic anhydride copolymer had a viscosity of 0.36 (4% solution of the polymer in methyl ethyl ketone.

A 169.5 g. portion of the above 1-decene/maleic anhydride copolymer was converted to the 1-decene/maleic half methyl ester half acid polymer by treating it with 150 g. of methanol using 0.5 g. of triethylamine as catalyst at 60° C. while agitating the mixture.

After removing excess methanol there was added 925 g. of epichlorohydrin and 20.8 g. of 40% benzyltrimethylammonium methoxide in methanol. Then at a pot temperature of 90° C. (head temperature 70°–78° C.) there was added 229 ml. of 25% sodium methoxide in methanol solution. The methanol distilled as addition proceeded. When the addition was completed, the temperature was raised to 115°–117° C. for 4 hours.

A portion of the resulting product was washed with water, and then with ether, dried over sodium sulfate, filtered, and distilled to remove ether, epichlorohydrin, etc. at 70° C. under aspirator vacuum. The product contained 5.17% of oxirane oxygen (98% of theory).

EXAMPLE 14

This example illustrates the usefulness of the compositions of this invention to form a film. For this example the poly(glycidyl methyl 1-hexene maleate) polymer, prepared as described in Example 8, was used.

Two solutions of the polymer were prepared, 50% in xylene and 50% in acetone, and cured by adding to the polymer solution diethylenetriamine (DETA) and methyl nadic anhydride (MNA) plus a catalyst, about 0.5% of N,N-dimethylaniline. The solutions were drawn into a film on tin foil, and allowed to air dry 16 hours at room temperature to remove the solvents. This was followed by a 1 hour cure at 100° C. The film was removed from the tin foil using mercury as a solvent for the tin. The resulting films were 0.0015 inch thick.

The films were then tested to determine the modulus of elasticity, tensile strength and elongation. The following data resulted.

| | DETA[1] | MNA[1] | E[2] | ST[3] | Elongation, percent |
|---|---|---|---|---|---|
| Solvent: | | | | | |
| Acetone | 6.4 | | 2.56 | 2,250 | 1.10 |
| Xylene | 6.4 | | 1.88 | 3,300 | 2.0 |
| Acetone | | 54 | 1.60 | 500 | 0.4 |
| Xylene | | 54 | 1.52 | 2,010 | 2.15 |

[1] Parts per 100 of the polymer.
[2] Modulus of elasticity ×10⁶, p.s.i.
[3] Tensile strength, p.s.i.

EXAMPLE 15

Samples of the tertiary amine treated poly(glycidyl methyl alkenyl/maleate polymers, prepared as described in the above examples were tested for their effectiveness as "wet end" sizing agents for paper, i.e., applied to the aqueous pulp slurry used to make the paper.

For this test an aqueous slurry containing 2% Bleached Gatineau Sulfite pulp refined to a Canadian Standard Freeness (CSF) of 507 was mixed with the following samples, each diluted with 300 ml. of water. Some samples were pretreated with base to raise the pH thereof to 9 or 10 to determine any difference in effectiveness.

| Sample: | Pretreatment |
|---|---|
| A) Example 3—11.40 g. | None / pH 9 / pH 10 |
| (B) Example 5—4.73 g. | None / pH 9 / pH 10 |

After preparing the solutions as indicated above, they were added to 250 ml. of water and then to the pulp slurry. The final pH of the treated pulp slurry in each case was adjusted to pH 7.0 and the treated slurry was mixed 15 minutes. Paper handsheets were prepared and dried. The resulting papers were tested for sizing effectiveness by standard ink and water resistance tests, and modified Penescope tests seven days after preparation.

The following data established that substantial sizing of the paper sheets was obtained with each sample.

| | Pretreatment, pH | Penetration, seconds | | Modified penescope, inches |
|---|---|---|---|---|
| | | Ink | H₂O | |
| Sample: | | | | |
| A | None | 2,650 | 135 | 13 |
| | 9 | 2,850 | 155 | 14 |
| | 10 | 2,500 | 1,150 | 21.5 |
| B | None | 1,012 | 75 | 9.5 |
| | 9 | 1,075 | 120 | 10.5 |
| | 10 | 1,225 | 190 | 13.5 |
| Control | 7 | 0 | 0 | 1.5 |

EXAMPLE 16

One mole, 226.4 g., of oxo-tridecyl vinyl ether (assay, 99.9%) was stirred and swept with nitrogen as it was heated to 72° C. with stirring by a high-torque stirring motor capable of about 50–500 r.p.m. and fitted with a blade closely conforming to the bottom of the 1 liter 4-necked flask. The flask was equipped with two accurately graduated additional funnels, the larger of which had a stopcock with an integral needle value for constant drop rate adjustment, a thermometer, and a condenser closed by a bubble-counting seal containing mineral oil.

When the temperature had been stabilized at 72° C. the addition of a warmed solution of 98.0 g. of maleic anhydride in 150 g. of reagent grade xylene was begun and continued at a constant rate such that the addition was completed in 4.5 hours. Initially, 3.0 ml. of a 10.0 ml. benzene solution of 0.51 g. of azobisisobutyronitrile (AIBN) was added; the remaining 7.0 ml. was added in 0.5 ml. portions at 15 minute intervals over the following 3.5 hours.

During the addition period the temperature was maintained at 72.5° C.±0.5° C. with efficient mixing as the viscosity increased. After completion of the additions, the viscous solution was stirred and heated, gradually increasing the temperature to 75° C. during two hours. A sample of the mixture was withdrawn and dried two hours at 130° C.; the resulting dry brittle polymer sample weighed 2.3 g. and was dissolved in methyl ethyl ketone to give a 1.00% solution. The average specific viscosity of this 1% copolymer sample at 25° C. in methyl ethyl ketone, multiplied by 4, was 1.82.

The remaining hot copolymer solution was treated dropwise with heating and stirring with 267 g. of isobutanol, heated and stirred at 75° C. an additional three hours, cooled, and diluted with xylene to 1074 g., giving a 30% (copolymer solids) solutions.

A one molar proportion of a tridecyl vinyl ether/maleic anhydride isobutanol partial ester prepared as described above is treated according to this invention by adding thereto an excess molar proportion of epichlorohydrin, relative to the equivalent of one mole of carboxyl group content in the maleic half ester moiety of the polymer, and a catalytic amount of hexadecyltrimethylammonium chloride, stirring until homogeneously mixed, and then adding gradually one molar proportion of sodium methoxide dissolved in excess methanol, while heating the mixture to reflux. Upon removing distillables there is obtained as product a tridecyl vinyl ether/poly(isobutyl glycidyl) mixed maleate ester polymer.

EXAMPLE 17

A 1 molar proportion of the tridecyl vinyl ether/poly-(isobutyl glycidyl) mixed maleate ester prepared as described in Example 16, is dissolved in a 2:1 volume proportion mixture of 2-propanol and water, and then treated slowly with one molar proportion of N,N,N,'N'-tetramethylethlenediamine, equivalent to the glycidyl content of the poly(isobutyl glycidyl) mixed ester, with stirring at room temperature, and then treated with dilute hydrochloric acid solution until the pH of the mixture is reduced to between about pH 5 to pH 6.

The resulting polyamine polymer may be applied to cellulose pulp slurries to size the resulting paper without any alkaline pre-treatment.

The embodiments of the invention in which an exclusive property or privilege is claimed are defined as follows:

1. A sized paper product comprising a cellulosic web sized with a sizing amount of a polyamine composition prepared by reacting an aliphatic diamine with a poly(alkyl glycidyl) mixed maleate ester of a member of the group consisting of (a) an adduct of maleic anhydride and a non-conjugated, olefinically unsaturated, non-hydroxylated fatty oil containing an average of from 10 to about 24 carbon atoms in the fatty acid moiety of said oil, and (b) a copolymer of maleic anhydride and a polymerizable alpha-olefin having from 2 to about 4 carbon atoms, in the presence of an organic hydroxyl containing material which is volatilizable at temperatures below 100° C., and water, at a temperature of from about 0° C. to 50° C., and then treating the resulting reaction product with an acid to adjust the pH of said reaction product to from about 5 to 7.0.

2. A sized paper product as described in claim 1 wherein the poly(alkyl glycidyl) mixed maleate ester is prepared by reacting an epihalohydrin with a carboxyl group containing lower alkyl partial ester of a member of the group consisting of (a) an adduct of maleic anhydride and a non-conjugated, olefinically unsaturated, non-hydroxylated fatty oil having an average of from 10 to about 24 carbon atoms in the carbon chain of the fatty acid moiety of said fatty oil, and (b) a copolymer of maleic anhydride and an alpha-olefin, in the presence of a quaternary ammonium catalytic compound, and an alkali metal salt forming basic compound at a temperature of from about 50° C. to reflux temperature.

3. A sized paper product as described in claim 2 wherein the epihalohydrin used is epichlorohydrin and partial ester starting material is a partial methyl ester of an adductof maleic anhydride and a non-conjugated, olefinically unsaturated, nonhydroxylated, fatty oil having an average of from 10 to about 24 carbon atoms in the carbon chain of the fatty acid moiety of said fatty oil.

4. A sized paper product as described in claim 3 wherein excess epichlorohydrin is reacted with a partial methyl ester of a maleic anhydride adduct of safflower oil.

5. A sized paper product as described in claim 2 wherein the epihalohydrin is epichlorohydrin and it is reacted with a partial alkyl ester of a copolymer of maleic anhydride and an alpha-olefin.

6. A sized paper product as described in claim 5 wherein epichlorohydrin is reacted with a partial methyl ester of a copolymer of maleic anhydride and an alpha-olefin hydrocarbon.

7. A sized paper product as described in claim 6 wherein excess epichlorohydrin is reacted with a partial methyl ester of a copolymer of maleic anhydride and styrene.

8. A sized paper product as described in claim 1 wherein the aliphatic diamine is an aliphatic amine of the formula

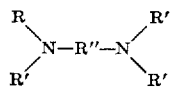

wherein R is selected from the group consisting of hydrogen and methyl, each R' is an alkyl radical of from 1 to 2 carbon atoms, and R" is a bivalent alkylene radical having from 2 to 6 carbon atoms, and the poly(alkyl glycidyl) mixed ester is a poly(methyl glycidyl) mixed maleate ester of a partial methyl ester of a copolymer of maleic anhydride and an alpha-olefin having from 2 to 40 carbon atoms, and the acid used to adjust the pH is a hydrohalic acid.

9. A sized paper product as described in claim 8 wherein N,N,N',N' - tetramethyl - 1,2 - ethylene diamine is reacted with a poly(methyl glycidyl) mixed ester of a copolymer of maleic anhydride and styrene in the presence of aqueous methanol, the hydrohalic acid is hydrochloric acid and the pH is adjusted from pH 5 to pH 6.

10. A method of sizing cellulosic containing paper sheet which comprises adding to the aqueous pulp used to prepare said paper a sizing amount of an aqueous dispersion of a polyamine composition prepared by reacting an aliphatic diamine with a poly(alkyl glycidyl) mixed maleate ester of a member of the group consisting of (a) an adduct of maleic anhydride and a non-conjugated, olefinically unsaturated, non-hydroxylated fatty oil containing an average of from 10 to about 24 carbon atoms in the fatty acid moiety of said oil, and (b) a copolymer of maleic anhydride and a polymerizable alpha-olefin having from about 2 to about 40 carbon atoms, in the presence of an organic hydroxyl containing material which is volatizable at temperatures below 100° C., and water, at a temperature of from about 0° C. to 50° C., and then treating the resulting reaction product with an acid to adjust the pH of said reaction product to from about 5 to 7, and forming a paper sheet from said aqueous pulp.

References Cited

UNITED STATES PATENTS

| 2,966,479 | 12/1960 | Fischer | 260—78.4 |
| 3,089,863 | 5/1963 | Hicks et al. | 260—78.4X |
| 3,374,209 | 3/1968 | Hay et al. | 260—78.4 |
| 3,382,142 | 5/1968 | Hine et al. | 162—168 |
| 3,427,219 | 2/1968 | Bonzagni | 162—168 |

S. LEON BASHORE, Primary Examiner

F. FREI, Assistant Examiner